June 2, 1953 H. LEYBURN 2,640,961
ELECTRIC GENERATOR FOR SHORT-CIRCUIT TESTING
Filed Feb. 23, 1951 2 Sheets-Sheet 1
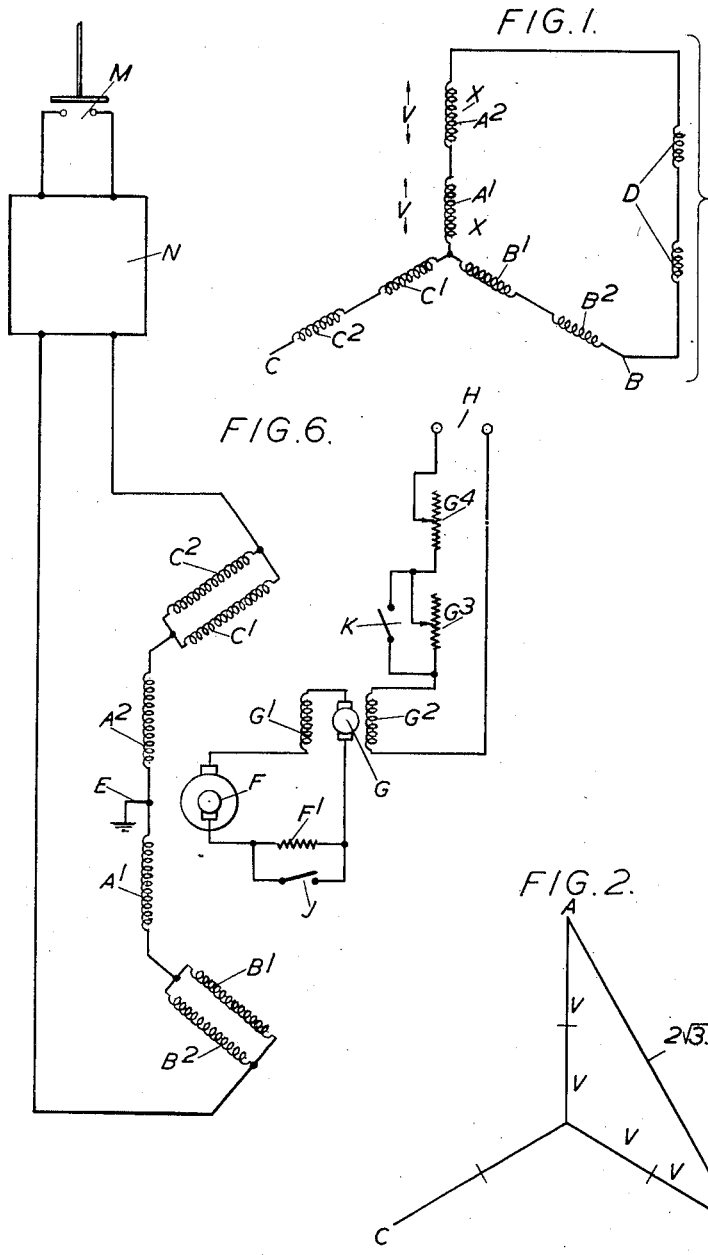
INVENTOR
Henry Leyburn
BY
Watson, Cole, Grindle
& Watson
ATTORNEYS Patented June 2, 1953

2,640,961

UNITED STATES PATENT OFFICE 2,640,961

ELECTRIC GENERATOR FOR SHORT-CIRCUIT TESTING

Henry Leyburn, Newcastle-on-Tyne, England, assignor to A. Reyrolle & Company Limited, Hebburn-on-Tyne, England, a British company Application February 23, 1951, Serial No. 212,316
In Great Britain March 1, 1950

2 Claims. (Cl. 322—83)

This invention relates to electric generators for short-circuit testing and to methods of performing such testing.

It is frequently required to supply power for a single-phase short-circuit test from one or more three-phase generators, and the problem with which the present invention is concerned is that of obtaining the maximum kva. from a given machine. The importance of this can be appreciated when it is realised that a machine of the kind involved, complete with its housing, auxiliaries and control gear, may cost several hundreds of thousands of pounds, so that a very important saving results if, for example, three machines can perform a test for which otherwise four would be required.

According to the present invention a three-phase generator having two windings per phase is arranged for use in single-phase short-circuit testing so that the output is obtained from all six windings, whereof the two windings of one phase are connected in series with one another, while the two windings of each of the other phases are connected in parallel with one another, the two parallel-connected pairs of windings being connected in series with each other and with the series-connected pair of windings in such direction that the resultant voltage of the two parallel-connected pairs reinforces that of the series-connected pair.

In a preferred form of the invention the excitation is increased by approximately 15% to make up the output voltage to approximately that of the pairs of windings of two phases all connected in series.

The invention will be further discussed with reference to the accompanying drawings, in which:

Figures 1 and 2 are respectively a circuit diagram and a vector diagram of a conventional arrangement hitherto employed, Figure 6 is a circuit diagram of a circuit including the testing generator.

Figure 1 shows the conventional arrangement hitherto employed in which the windings $A^2$, $A^1$, $B^1$ and $B^2$ of two phases are all connected in series to the primary winding D of a power transformer. The windings $C^1$ and $C^2$ of the third phase contribute nothing.

Figure 3 shows the arrangement in accordance with the invention in which the windings $C^1$ and $C^2$ and connected in parallel, the windings $B^1$ and $B^2$ are connected in parallel, and the windings $A^1$ and $A^2$ are connected in series with each other and with the parallel-connected pairs of windings $B^1$ $B^2$ and $C^1$ $C^2$, the whole being connected to the power transformer.

Figure 3:
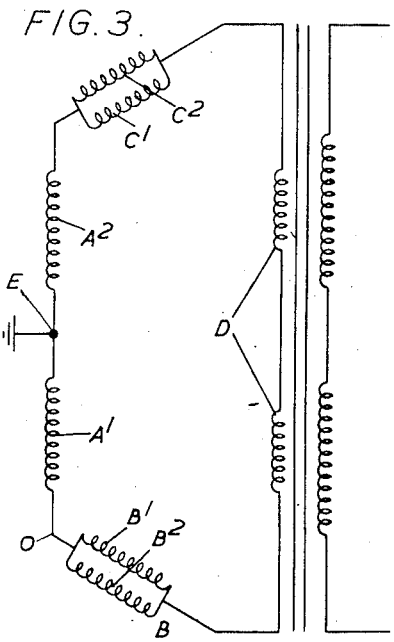
Figures 3 and 4 are respectively a circuit diagram and a vector diagram of an arrangement incorporating the invention.
Figure 4:
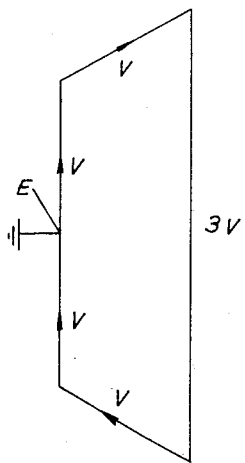

The kva. available for a short-circuit test is significantly limited only by the terminal voltage of the machine and the reactance of its windings, varying as the square of the voltage and inversely as the reactance. Thus if the voltage generated by each of the two windings of each phase at normal excitation is V and the reactance of each winding is X, then the kva. available for a single-phase short-circuit test, with the arrangement of Figure 1, would be expressed by $$\frac{3V^2}{X}$$

the windings of the third phase contributing nothing. By connecting the windings of two phases in parallel pairs and connecting these pairs in series with the series-connected windings of the third phase, as shown in Figure 3 in accordance with the invention, the voltage is reduced from $2\sqrt{3}$ V as shown in Figure 2 to 3V as shown in Figure 4, whilst the internal reactance is reduced from 4X to 3X. Thus the voltage has been reduced by some 15% below the normal line voltage but the reactance has been reduced by as much as 25%. In fact the same kva. is available at a reduced voltage. Thus in the case of a 22 kv. machine where the value of V, the voltage of a winding, would be 6.35 kv., the terminal voltage would be reduced from 22 kv. to 19.05 kv.

In general it is necessary that the short-circuit test should be performed at standard line voltage. If this is the case it rules out the possibility of appreciable over-excitation with the normal connection, and in any case over-excitation is subject to severe practical limitations for a big machine. For example there is the danger of overstressing the main insulation and in addition a 20% increase in excitation may well require a field current increase of 400%, so that some 20% is probably the practical limit of over-excitation even where it is not essential to make the test at a standard voltage.

Figure 5:
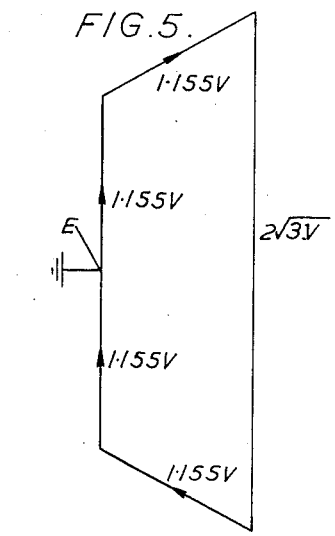
Figure 5 is a vector diagram similar to Figure 4 with increased excitation.

With the arrangement according to the present invention, the reduction of output voltage resulting from the arrangement of connections is such that it can be conveniently restored by over-excitation, the amount of over-excitation required being approximately 15%. Accordingly in a preferred arrangement of which Figure 5 is a vector diagram, the machine is over-excited by 15.5% to make up the output voltage to approximately that of the pairs of windings of two phases all connected in series, i. e. that between the line terminals when star-connected. In the case of the 22 kv. machine the voltage of a winding would be increased from 6.35 kv. to 7.335 kv. thus restoring the terminal voltage from 19.05 kv. to 22 kv. In these circumstances the kva. output available for short-circuit testing is increased by 33% so that three generators can provide an output for which four would otherwise be required.

A further advantage of the invention is that the arrangement lends itself to earthing at such a point that the voltage stress of the insulation to earth is nowhere greater than that for which the machine is designed. Thus in the preferred arrangement shown in Figure 3 the two windings $A^1$ and $A^2$ of one phase are connected in series, with their common point E earthed, whilst the parallel connected windings $B^1$ and $B^2$ of one other phase are connected between one of these windings and one terminal, and the parallel connected windings $C^1$ and $C^2$ of the third phase are connected between the other winding and the other terminal.

The connection of the generator to the circuit breaker to be tested, and the test equipment through which it is connected, form no part of the present invention and may be constructed in accordance with well known practice; by way of example, Figure 6 shows a suitable circuit.

In the arrangement shown in Figure 6 the field F of the main alternating current testing generator A, B, C is connected through a resistor $F^1$ to a direct current exciter G having a series field winding $G^1$ and a separately excited field winding $G^2$ supplied through variable resistors $G^3$ and $G^4$ from a direct current supply H. Contacts J and K are provided respectively to short circuit the resistors $F^1$ and $G^3$.

The output from the main alternating current testing generator A, B, C is taken to the circuit-breaker M to be tested through auxiliary testing equipment of well known type indicated at N, which may include a master switch and other switches, power transformers, reactors and resistors together with shunts or current transformers and voltage transformers for connection to suitable oscillographs or other measuring equipment.

The required over excitation of the main AC generator can be obtained by suitable operation of the resistor $G^3$ and the contacts J and K.

What I claim as my invention and desire to secure by Letters Patent is:

1. An electric circuit for single phase short-circuit testing with the aid of three-phase generator means having two windings per phase in which the two windings of one phase are connected in series with one another, while the two windings of each of the other phases are connected in parallel with one another, means connecting the two parallel-connected pairs of windings in series with each other and with the series-connected pair of windings, in such direction that the resultant voltage of the two parallel connected pairs reinforces that of the series-connected pair, so that the output is obtained from all six windings.

2. A circuit as claimed in claim 1, including means for exciting the generator to approximately 15% above the normal excitation to make up the output voltage to approximately that of the pairs of windings of two phases all connected in series.

HENRY LEYBURN.

No references cited.